(12) United States Patent
Angione

(10) Patent No.: US 6,378,304 B1
(45) Date of Patent: Apr. 30, 2002

(54) HYDRAULIC CONTROL DEVICE FOR MOTOR VEHICLE CLUTCH IN PARTICULAR

(75) Inventor: Pasquale Angione, Paris (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/674,045
(22) PCT Filed: Feb. 25, 2000
(86) PCT No.: PCT/FR00/00482
   § 371 Date: Jan. 16, 2001
   § 102(e) Date: Jan. 16, 2001
(87) PCT Pub. No.: WO00/05282
   PCT Pub. Date: Aug. 31, 2000

(30) Foreign Application Priority Data

Feb. 26, 1999 (FR) .............................. 99 02426
Jun. 9, 1999 (FR) .............................. 99 07269

(51) Int. Cl.⁷ ................................................ B60T 11/26
(52) U.S. Cl. .......................... 60/588; 92/170.1; 92/255
(58) Field of Search ............................. 92/169.1, 170.1, 92/172, 255; 60/588

(56) References Cited

U.S. PATENT DOCUMENTS

| 3,266,383 A | * | 8/1966 | Cairns .................... 92/170.1 X |
| 4,510,752 A | * | 4/1985 | Gaiser ......................... 60/562 |
| 4,998,461 A | | 3/1991 | Ishiwata et al. |
| 5,046,315 A | * | 9/1991 | Nakamura et al. ............. 60/562 |
| 5,121,686 A | * | 6/1992 | Schonlau et al. ......... 60/588 X |
| 5,142,965 A | * | 9/1992 | Zander .................. 92/170.1 X |
| 5,187,934 A | * | 2/1993 | Mori ........................ 60/588 X |
| 5,243,823 A | * | 9/1993 | Jordan et al. .............. 92/169.1 |
| 6,289,790 B1 | * | 9/2001 | Rey .......................... 92/170.1 |

* cited by examiner

Primary Examiner—John E. Ryznic
(74) Attorney, Agent, or Firm—Liniak, Berenato, Longacre & White

(57) ABSTRACT

A clutch control device (10) comprising a cylinder body (17) and a piston (21, 42) axially sliding in an inner bore (22) of the cylinder body (17) and at least a dynamic seal (59A, 59C) borne by the cylinder body (17, 17B). The cylinder body (17) comprises, axially arranged successively from the front rearwards, a blind front component (17A) comprising a base (24), a central component (17B) and a rear component (17C) open rearwards made of plastic material and assembled together sealed by welding (58A, 58C) with indirect heat input, and the inner bore (22) comprises a front portion (22A) and a rear portion (22C), and the dynamic seal (59A, 59C) is housed in the central component (17b) of the cylinder body (17).

21 Claims, 3 Drawing Sheets

HYDRAULIC CONTROL DEVICE FOR MOTOR VEHICLE CLUTCH IN PARTICULAR

BACKGROUND OF THE INVENTION

1. Field of the Invention

This invention relates to apparatus for hydraulic brake or clutch control, in particular for a motor vehicle, comprising at least one emitter or receiver cylinder having a piston.

More particularly, the invention relates to apparatus for hydraulic brake or clutch control for a motor vehicle, comprising at least one cylinder which includes a cylinder body having at the front a base portion and being open at the rear, a piston sliding axially in an internal bore of the cylinder body, and at least one dynamic sealing member carried by the cylinder body for cooperation with the outer periphery of the piston, wherein the cylinder body is of synthetic material such as plastics material, and wherein the piston has a front face bounding a hydraulic chamber.

2. Description of Related Art

An apparatus of that kind is described, for example, in the documents DE-U-29516488, FR-B-274920 or in French patent application No. 98 07213 of Jun. 9, 1998.

SUMMARY OF THE INVENTION

An object of the invention is to propose a control apparatus of the type mentioned above, having reduced manufacturing costs and simplifying the design of the cylinder body.

With this in view, the control apparatus in accordance with the invention is characterised in that the cylinder body includes, arranged consecutively in the axial direction from front to rear, a blind front piece which includes the said base portion, a central piece, and a rear piece which is open towards the rear, the said pieces being joined together in a sealed manner, in that the internal bore consists of a front portion and a rear portion, which are formed in the front piece and rear piece respectively of the cylinder body, and in that the said dynamic sealing member is mounted in the central piece of the cylinder body.

With such a design it is in particular possible to standardise the front and rear pieces of the cylinder body and to create a range of products by making a range of central pieces which are different from each other, in particular for the purpose of incorporating means for feeding the hydraulic chamber and means for fastening the control apparatus, which vary from one apparatus to another, especially as a function of the model and type of vehicle that it is to equip.

In accordance with further features of the invention:

the said sealed joint is an adhesively bonded joint;

the said sealed joint is a joint which is made by welding with indirect application of heat;

the said sealed joint is a joint which is made by welding with the aid of at least one energy source of the laser type;

the said sealed joint is a welded joint made by infrared radiation, for example of the laser type;

the said sealed joint is a joint made by ultrasonic welding;

the said sealed joint is a joint made by friction welding;

the said sealed joint is a joint made by high frequency welding;

the said sealed joint is a welded joint made by induction welding of ferromagnetic members;

the sealed joint is obtained by mirror welding;

the piston extends through the central piece of the cylinder body with a radial clearance;

an axially oriented tubular rear portion and an axially oriented tubular front portion of the front piece and rear piece of the cylinder body, respectively, are welded to a complementary front portion and rear portion, respectively, of the central piece of the cylinder body;

the outer peripheral surface of the said tubular portion is fixed sealingly, by welding with indirect application of heat, to an internal peripheral surface of the said complementary portion of the central piece of the cylinder body;

the inner peripheral surface of the said tubular portion is fixed sealingly, by welding with indirect application of heat, to an external peripheral surface of the said complementary portion of the central piece of the cylinder body;

the said tubular portion is in axial abutment against a radial shoulder of the central piece of the cylinder body;

the central piece includes a transverse duct which is open in a substantially radial direction into an axially oriented central hole of the central piece in facing relationship with the outer periphery of the piston;

the central piece of the cylinder body is configured as a transverse plate for fastening the control apparatus;

the apparatus includes two dynamic sealing members, namely a front member and a rear member, which are mounted within the central piece of the cylinder body;

the front dynamic sealing member and the rear dynamic sealing member are each, respectively, disposed in a housing formed in the central piece of the cylinder body, which is open radially inwards;

the rear end of the rear piece of the cylinder body includes at least one abutment adapted to cooperate with a rear end of the piston so as to limit rearward axial displacement of the piston;

the piston includes a peripheral piston jacket which is fixed axially to the piston and which slides axially in the internal bore of the cylinder body;

the piston jacket has at least one hole for providing communication between the inside and the outside of the piston jacket, and the hole is adapted to be displaced to either side of a dynamic sealing member;

the piston jacket is of metal.

BRIEF DESCRIPTION OF THE DRAWINGS

Further features and advantages of the invention will appear on a reading of the following detailed description, for an understanding of which, reference will be made to the attached drawings in which.

DETAILED DESCRIPTION OF THE PREFERRED EMBODIMENTS

Figure 1:
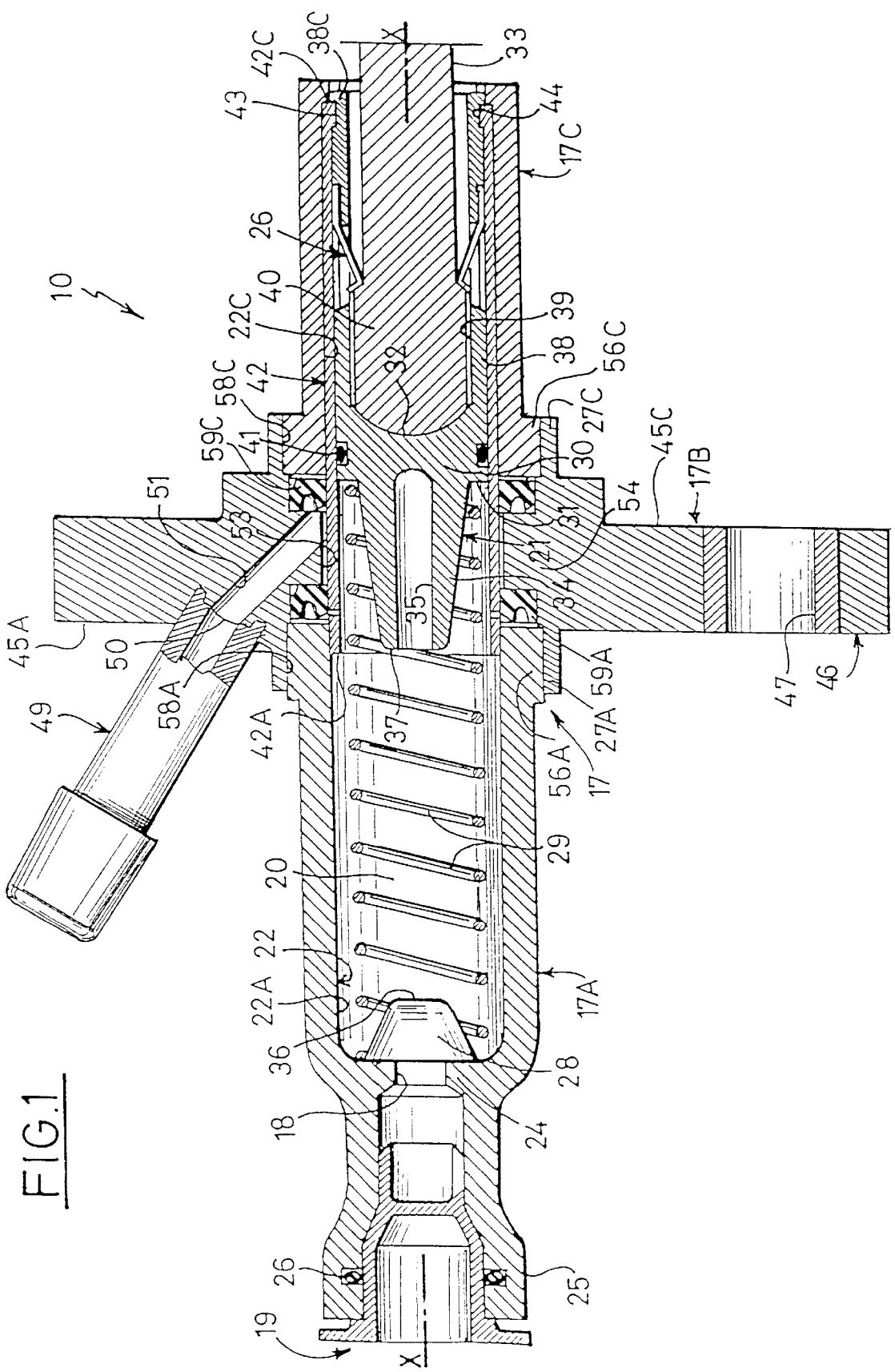
FIG. 1 is a view in longitudinal axial cross section of a first embodiment of an emitter cylinder made in accordance with the main feature of the invention, and in which the piston is shown in a retracted position.

In the following description, those elements which are identical, similar or analogous to each other will be designated by the same reference signs.

The drawings show a control cylinder in the form of an emitter in a control apparatus for a motor vehicle clutch.

Such an apparatus (not shown) includes an emitter cylinder which is connected through a duct to a receiver cylinder, the structure of which is similar to the emitter cylinder.

Each receiver or emitter cylinder comprises a piston which is movable axially inside a cylinder body so as to define a variable volume hydraulic chamber. A connecting port, into which the duct exhausts, is open into the hydraulic chamber.

The emitter cylinder includes a piston rod which is coupled for example to a clutch pedal operated by the driver, or to an actuator which is started in accordance with pre-determined programmes.

The piston of the emitter cylinder is arranged to expel a fluid such as oil, which is contained in the hydraulic chamber, towards the channel or duct connecting the emitter cylinder to the receiver cylinder.

When the clutch is engaged, the volume of the hydraulic chamber of the emitter cylinder is at a maximum, while the volume of the control chamber of the receiver cylinder is at a minimum.

In the operation of disengaging the clutch, the volume of the hydraulic chamber of the emitter cylinder diminishes, while the volume of the control chamber of the receiver cylinder increases.

The piston of the receiver cylinder then works on a rod which acts for example on the declutching fork that actuates the clutch release bearing which is part of the friction clutch.

In another version, the piston works in traction on the said fork through a cable or other means.

Each of the emitter and receiver cylinders includes a spring which works between the piston and the base of the cylinder body. When the driver releases pressure on the clutch pedal, or when the actuator returns to its initial clutch-engaged position, the return spring of the emitter cylinder expands so as to return the piston to its initial position, while the return spring of the emitter cylinder is compressed by the clutch spring, such as a diaphragm, which thereby returns the piston of the receiver cylinder to its initial position.

In the drawings, the emitter cylinder 10 is shown in a delivery position and comprises a cylinder body 17 which has an inlet port 18, closed off by a plug 19. It is through this inlet port that the duct or channel (not shown) which connects the receiver cylinder (not shown) to the emitter cylinder 10, is open into the hydraulic chamber 20 of the emitter cylinder.

The chamber 20 has a variable volume, and it is bounded by the body 17 and the piston 21 which is mounted for axial movement within the cylinder body 17.

The cylinder body 17 is of generally tubular form, and in accordance with the features of the invention it consists of three distinct pieces, which are made separately by moulding in plastics materials, and which are disposed in axial succession from front to rear, that is to say from left to right in the drawings, and which consist of a front piece 17A which includes the orifice 18 and the plug 19 at its front axial end, a central or intermediate piece 17B, and a rear piece 17C.

The cylinder body 17, in its three pieces 17A, 17B and 17C, has an internal bore 22 which is generally blind and formed on an axis X-X corresponding to the general axis of symmetry of the cylinder body 17, with, at the front, a transversely oriented base portion 24 in which the inlet port 18 is open, and which is part of a connecting portion 25 for connection of the above mentioned duct, for example by seaming, the connecting portion 25 having for this purpose internal passages 26 for receiving a clip which fastens the duct to the emitter cylinder. In another version, the connecting portion may be of the screw type.

The cylinder body 17 is generally open at the rear, that is to say its rear piece 17C is itself open towards the rear.

Each of the two axial end pieces, that is to say the front piece 17A and the rear piece 17B, is in the general form of a tubular member of generally simple design, easy to make by moulding in plastics material.

The internal bore 22, for guiding the piston 21 in sliding movement, comprises, in accordance with the features of the invention, a front portion 22A formed in the front piece 17A, and a rear portion 22C which is formed in the rear piece 17C, the two portions, namely the front portion 22A and rear portion 22C, being aligned and coaxial with each other.

The piston 21 is arranged to slide in the cylinder body 17, and more precisely in the internal bore 22 of the latter, forward from the rear, starting from the retracted or declutched position shown in FIG. 1, towards an advanced or clutch engaged position (not shown).

In the retracted or declutched position shown in FIG. 1, the hydraulic chamber 20 and the control fluid are pressurised, while in the advanced position, the chamber 20 and the control fluid are depressurised.

A generally frusto-conical projection 28 is formed integrally by moulding with the transverse base portion 24, and it extends axially towards the rear within the bore 22, so as to constitute a centre for centring a return spring 29, which in this example is a helical spring acting between the cylinder body 17 and the piston 21, and more precisely between the transverse base portion 24 and the front of the piston 21.

The port 18 is of course formed through the base portion 24, and is open at the side of the projection 28 which is formed integrally by moulding with the base portion 24.

The body of the piston 21 is a component moulded in plastics material in a generally tubular form, and it has in its front part a transverse wall 30, the front transverse face 31 of which bounds the hydraulic chamber 20 axially at the rear, while its rear face 32 is in cooperation with the head of a piston rod 33.

The body of the piston 21 is extended axially forward from its front transverse face 30 by a chimney portion 34 which has a frusto-conical external profile, with a blind central hole 35 of cylindrical form, the axially oriented base of which is defined by the front face 31 of the wall 30.

The helical return spring 29 is mounted around the chimney portion 34, the base of which serves for centring the return spring 29, and the rear axial end of the spring bears on the front face 31 of the transverse wall 30 of the piston 21.

The spring 29 therefore works axially between the base portion 24 and the front face 31.

The rear axial transverse end face 36 of the projection 28 may constitute an abutment with which the transverse front axial end face 37 of the chimney portion 34 is arranged to cooperate.

More precisely, in the deployed position the piston 21 comes into contact with the face 36 of the projection 28 through the front face 37 of the chimney portion 34, the cylinder body 17 accordingly having an abutment 28 which limits the axial forward displacement of the piston 21.

The tubular body of the piston 21 of plastics material is extended axially towards the rear from the transverse wall 30 by a sleeve portion 38 which has a bore 39, the front base portion of which is defined by the rear face 32 of the transverse wall 30 of the piston 21.

The base 32 of the bore 39 is of generally hemispherical form, for receiving the complementary head 40 formed at the axial front end of the piston rod 33.

The head 40, and therefore the piston rod 33, is retained axially within the bore 39, and is therefore held with respect to the piston 21, by an elastically deformable element 26 which will not be described in any greater detail here.

The rod 33 is accordingly mounted for rotation within the piston 21, and more precisely with respect to the base 32 of the sleeve portion 38.

The piston 21 carries at its cylindrical outer periphery a static seal 41 for sealing the piston, which in this example is an O-ring seal mounted in an internal radial groove formed in the cylindrical outer periphery in line with the transverse wall 30. Other forms of static seals may be envisaged.

The static seal 41 is arranged to cooperate with the cylindrical inner peripheral surface of a piston jacket 42 which in this example is of metal.

The piston jacket 42 is a tubular element which surrounds the piston 21, the latter being received within the jacket 42.

The piston jacket 42 is made for example of anodised aluminium or treated steel. The piston jacket 42 extends forward, in axial projection with respect to the chimney portion 34, in such a way that, in the advanced position which is not shown, the chimney portion 34 is in contact with the projection 28, while the transverse front terminal edge 42A is spaced axially away from the transverse base portion 24 that faces it. The dimensions of the piston jacket 42 are such that the chimney portion 34 and the return spring 29 are received radially, with a clearance, within the piston jacket 42.

The piston jacket 42 is in intimate contact on its cylindrical inner periphery with the cylindrical outer periphery of the piston 21 and with the outer periphery of the static seal 41.

The piston jacket 42 is fixed axially with respect to the piston 21, this being achieved firstly by a radial gripping effect between the piston 21 and the piston jacket 42, with cooperation of the static seal 41. In order to complete this relative axial immobilisation of the piston 21 with respect to the piston jacket 42, and their immobilisation in rotation, it is in this example proposed that the piston jacket 42 has, in the region of its rear axial terminal edge 42C, lugs 44 which are received in engagement within a fastening groove 43 which is formed radially, facing towards the axis X-X, in the rear end portion 38C of the sleeve portion 38 of the piston 21.

Other means for coupling the piston 21 to the piston jacket 42, axially and in rotation, may be envisaged without departing from the scope of the invention.

In all cases, there is provided in this way a unitary sub-assembly consisting of the piston 21 and piston jacket 42, constituting a unit which is movable axially in the internal bore 22 of the cylinder body 17, the piston jacket 42 and the piston 21 being components which are concentric and coaxial with the axis X-X.

The cylinder body is arranged to be fixed on a fixed part of the vehicle, and is therefore part of the generally fixed portion of the emitter cylinder 10, while the piston 21 with its piston rod 33 is part of the movable portion of the emitter cylinder.

In accordance with the features of the invention, the central portion 17B of the cylinder body 17 is made in the form of an intermediate plate which is disposed axially between the front portion 17A and the rear portion 17C of the body 17.

The plate 17B extends transversely, in a radially oriented plane at right angles to the axis X-X.

The central piece 17B constitutes a fastening plate and is moulded in plastics material, and it may for example have fastening ears 46 which include holes 47 for the passage through them of fastening members, usually screws, for securing the cylinder body 17 and therefore the emitter cylinder 10, on a fixed part of the motor vehicle.

FIG. 1 also shows a tube 49 fixed to the central piece 17B of the cylinder body 17.

The tube 49 enables the interior of the cylinder body 17 to be connected to a main feedback reservoir (not shown), which is mounted outside the emitter cylinder 10, the hydraulic chambers of the emitter and receiver cylinders being filled with a hydraulic fluid, such as oil for example.

The reservoir is partly filled by the hydraulic fluid and it is connected through a duct, not shown in the drawings, to the tube 49, with the latter opening into an aperture 50 which is formed in the central piece 17B in its transverse front end face 45A. The aperture 50 is one end of a duct 51 which is oriented at an inclination to the axis X-X, and which extends through the central piece 17B from its transverse front face 45A, to open towards the rear and axially inwards into a cylindrical central hole 53, oriented axially and formed in the solid central portion 54, which is of generally cylindrical annular form, of the central piece 17B, and which, as will be explained in detail later herein, is substantially coaxial and concentric with the front portion 22A and rear portion 22C of the internal bore 22, the internal diameter of the cylindrical hole 53 being in this example greater than the internal diameter of the bore 22, so that the cylindrical outer peripheral surface of the piston jacket 42 extends through the hole 53 with a radial clearance between these two elements.

The tube 49 is fastened to the central piece 17B by force-fitting of its rear end in a complementary housing formed in the transverse front face 45A of the central piece 17B, and then for example by a welding operation with indirect heating.

With this in view, the tube 49 is of course made in a plastics material which is compatible with that in which the central piece 17B of the cylinder body 17 is moulded.

The first embodiment, according to the invention, of the means for joining and sealingly fastening the three components which constitute the cylinder body 17 together, will now be described with reference to FIGS. 1 and 2.

Figure 2:
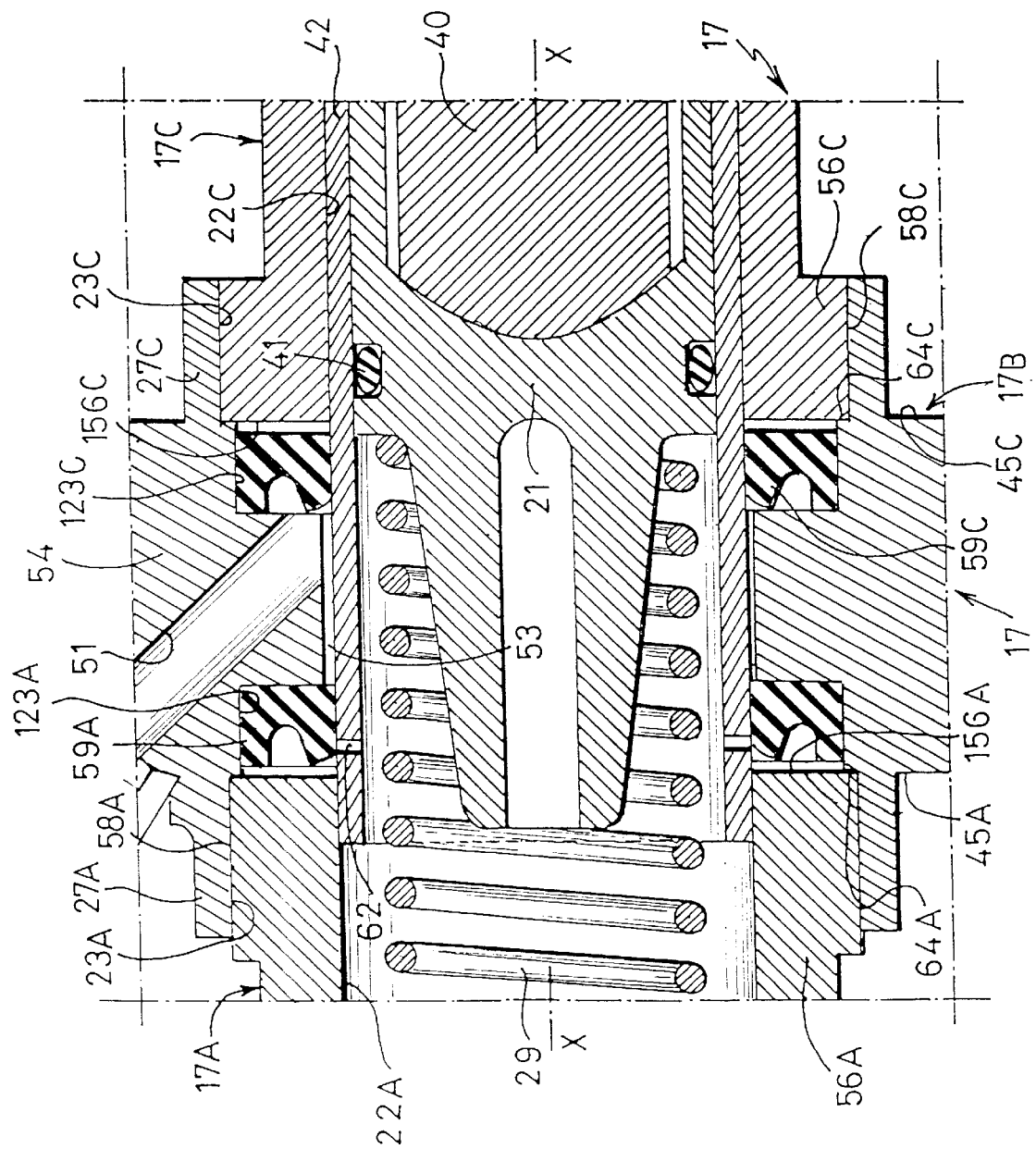
FIG. 2 is a detail view, on a larger scale, of the central part of the emitter cylinder of FIG. 1, showing the sealed fastening of the three components of the cylinder body.

In the first embodiment shown in FIGS. 1 and 2, the axial rear end portion 56A of the front piece 17A, and the axial front end portion 56C of the rear piece 17C, are each formed as a solid tubular portion, the radial thickness of which is slightly greater than that of the tubular main portion of the front piece 17A or rear piece 17C respectively, the two tubular portions 56A and 56C preferably having the same radial dimensions, that is to say, in particular, the same outer and inner diameters.

Each tubular portion 56A, 56C is received axially in a complementary housing formed in the central piece 17B in facing relationship with it.

More precisely, the solid central portion 54 of the central piece 17B in the form of a plate includes two sleeve portions or bushes, namely a front sleeve portion 27A and a rear sleeve portion 27B, which extend axially forwards and rearwards respectively from the opposed front transverse face 45A and rear transverse face 45C respectively of the central piece 17B.

Each bush 27A, 27C is of generally cylindrical annular form and is formed integrally by moulding with the solid central portion 54 of the central piece 17B, and it defines an internal cylindrical peripheral surface 23A, 23C, which are open axially towards the front and rear respectively, and which are bounded axially towards the rear and the front respectively by a transverse front shoulder 64A and a transverse rear shoulder 64C respectively, each of which constitutes an axial abutment which determines the relative axial position of the front and rear pieces 17A and 17C respectively with respect to the central piece 17B, because of the abutting engagement against the said shoulder 64A, 64C of the respective transverse end face, namely the rear face 156A of the rear tubular portion 56A and the front face 156C of the tubular front portion 56C.

The cylindrical housings 23A and 23C thus precisely determine the relative axial position of the front piece 17A and the rear piece 17B respectively of the cylinder body 17, and also the alignment and perfect coaxiality of the front portion 22A and rear portion 22C of the internal bore 22 of the cylinder body 17 in which the piston jacket 42 is mounted for sliding movement.

Each tubular portion 56A, 56C is force-fitted axially in the corresponding sleeve portion 27A, 27C until the faces 156A, 156C come into axial engagement with the shoulders 64A and 64C.

The sealed fastening of the front piece 17A and rear piece 17C on the central piece 17B is, in accordance with the features of the invention, achieved by welding the tubular portions 56A, 56C in the housings 23A, 23C with indirect application of heat.

Thanks to the design according to the invention, the sealed welding zone 58A, 58C corresponds to the interface between the cylindrical outer peripheral surfaces of the tubular portions 56A, 56C and the cylindrical inner peripheral surfaces 23A, 23C of the sleeve portions 27A, 27C.

The welding zone 58A, 58C, in which the operation of welding by indirect heating is effected, is thus very precise and is limited without the welding operation having any detrimental impact on the other parts and other components of the emitter 10.

The design in accordance with the embodiment shown in FIGS. 1 and 2 is more particularly well adapted to achieving an assembly with sealed joints, by the use of a welding operation with infrared radiation.

To this end, the central piece 17B according to the invention is made by moulding in a plastics material which is transparent to infrared rays, while the front end piece 17A and rear end piece 17B are preferably made in a plastics material that absorbs infrared rays, for example the transparent plastics material identical to the piece 17B, and to which is added at least one additive such as carbon in a proportion of 1 to 2% so as to make it absorbent to the said infrared rays.

By way of variant, and making use of twin-material moulding methods, only the parts which are arranged to be welded together are made in the materials transparent or absorbent to infrared rays.

The infrared welding operation is then for example carried out using a laser beam which causes the interface zone 58A, 58C to be welded.

The invention is not limited to the operation of making a sealed weld by infrared radiation.

It is also possible to achieve this sealed fastening by ultrasonic welding, high frequency welding, or induction welding to form joints between ferromagnetic members, with the joints being able in particular to be formed by introducing small ferromagnetic particles directly into the components to be welded together.

In another version, the joint is made by mirror welding, that is to say welding with the aid of an intermediate heating piece which is withdrawn afterwards.

The effectiveness with which the hydraulic chamber 20 is sealed with respect to the outside is in this example obtained by means of two dynamic seals, namely a front seal 59A and a rear seal 59C, which in accordance with one feature of the invention are carried by the central piece 17B of the cylinder body 17, and each of which cooperates with the outer periphery of the piston jacket 42, that is to say with the cylindrical outer surface of the said piston jacket 42.

Each dynamic seal, namely the front seal 59A and rear seal 59C, is in this example a lipped channel seal which is mounted in a complementary seating 123A, 123C formed in the solid central portion 54 of the central piece 17B, and open radially inwards so that each dynamic seal 59A, 59C is able to cooperate through its radially inner lip with the outer cylindrical surface of the piston jacket 42. In another version, each dynamic seal may be a composite sealing member.

The central piece 17B thus serves, by virtue of its solid central portion 54, as a seal box which, in this example, carries two dynamic sealing members, though a single dynamic sealing member may be provided without departing from the scope of the invention.

The seating 123A is open axially at the front, in such a way that the front dynamic sealing member 59A is in axial facing relationship with the rear transverse face 156A of the tubular portion 56A.

The piston jacket 42 has at least one hole 62 for putting the interior and exterior of the piston jacket 42 into communication with each other.

The hole 62 is located, as a function of the axial movement of the piston 21 with its piston jacket 42, on either side of the lip of the front dynamic sealing member 59A. When the clutch is engaged, the hole 62 provides communication between the hydraulic control chamber 20 and the external main reservoir. During actuation of the clutch, the communication is interrupted because the hole 62 is displaced with respect to the seal 59A, forwards with reference to FIG. 2.

Several holes 62 may of course be provided in a common transverse plane, so as to give a larger flow of fluid and to avoid the need to adopt an angular orientation during fitting, the holes 62 being spaced apart circumferentially at regular intervals.

Communication between the hydraulic chamber 20 and the reservoir takes place through the holes 62 and the annular axial space delimited between the external cylindrical surface of the piston jacket 42 and the internal cylindrical surface of the hole 53 of the solid central portion 54 of the central piece 17B.

In accordance with an aspect which is not shown in the drawings, and so as to prevent fluid from escaping to the outside, a sealing bellows may be provided, interposed between the cylinder body 17 and the piston rod 33, for example between the central piece 17B and the piston rod.

The presence of two dynamic sealing members 59A, 59C can however enable the need for a complementary sealing bellows to be avoided.

In that case a complementary cap (not shown) can if necessary be provided for protecting the rear piece 17C, which is for example fixed around the rear sleeve portion 27C of the central piece 17B, and which surrounds the rear piece 17C, with the piston rod 33 passing through it.

Such a protective cap can of course surround a sealing bellows.

Figure 3:
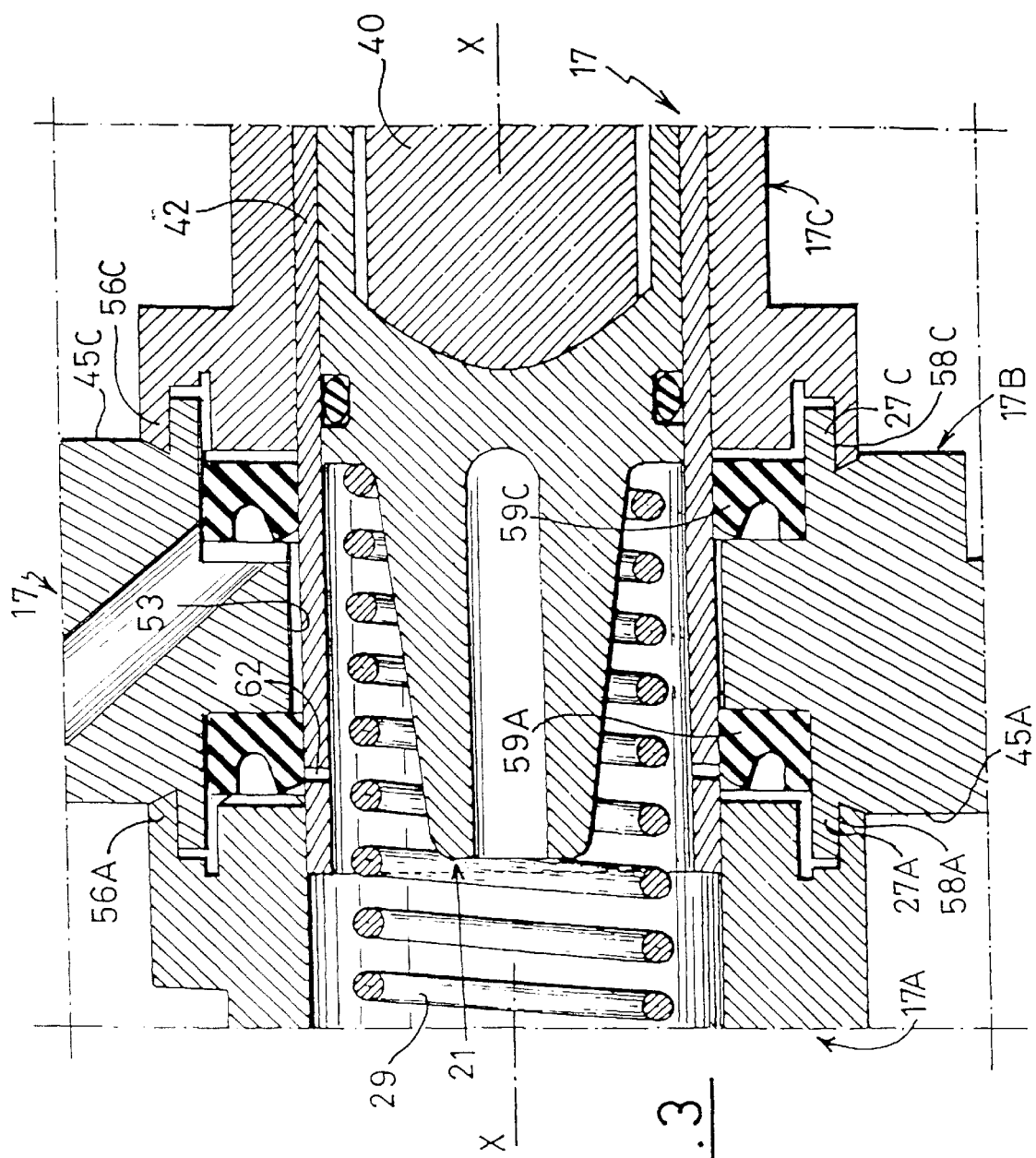
FIG. 3 is a view similar to that in FIG. 2, but shows a second embodiment of the invention.

The second embodiment shown in detail in FIG. 3 differs from the foregoing as regards the arrangement of the tubular portions and the complementary sleeve portions, so that it proposes an embodiment which is more particularly adapted for a friction welding operation to achieve a sealed fastening.

To this end, the front sleeve portion 27A and rear portion 27C are received axially within complementary portions of the tubular portions 56A, 56C which are arranged radially on the outside of the sleeve portions 27A, 27C, that is to say each of the two sealed welding zones 58A, 58C corresponds to the interface zone between the external cylindrical surfaces of the sleeve portions 27A, 27C and the complementary internal cylindrical surfaces of the external radial parts of the tubular portions 56A, 56C, which are formed accordingly.

The sealed weld in this example is preferably made by friction welding in the region of the zones 58A and 58C. Welding is carried out externally with respect to the sleeve portions 27A, 27C by vibration and relative rotation of the front piece 17A and rear piece 17C with respect to the central piece 17B.

In another version not shown, and without departing from the scope of the invention, one of the outer axial pieces 17A or 17C can be designed as in the first embodiment, while the other outer axial piece 17C or 17A is designed as in the second embodiment.

The two outer axial pieces 17A, 17C may be made by moulding in the same plastics material or in a different plastics material, depending, in particular, on what technique is used for making the sealed weld joining each outer axial piece to the central piece 17B.

Without departing from the scope of the invention it is also possible to design the three pieces in mechanical inversion, that is to say the central piece 17B includes tubular portions which extend axially outwards and which are received in complementary sleeve portions of the two outer axial pieces 17A and 17C.

In another version, the joint is made by adhesive bonding. It is of course possible to fix one of the pieces 17A, 17C by adhesive bonding on the central piece 17B and to secure the other one of the pieces 17A, 17C by welding on the piece 17B. Thanks to the invention it is possible to fix in position, for example, the pieces 17A, 17B in one place of manufacture, and then to secure the piece 17C finally in another manufacturing location. In all cases, the central piece constitutes a seal carrier. The presence of the spring 29 is of course not essential, as the return function may be ensured by means of a spring associated with the brake or clutch pedal. The piston may be made entirely of plastics material, but metallised using surface treatment for makind contact with the seals. Friction welding is to be understood to mean, for example, vibration welding, rotation welding, or mirror welding. Preferably the pieces 17A, 17B are force-fitted into the piece 17C so as to enable the weld or adhesive bond to be optimised. It is of course possible to carry out a conical force-fit. During the welding operation, heat may be applied directly to at least one of the pieces to be welded.

What is claimed is:

1. Apparatus (10) for hydraulic brake or clutch control, comprising at least one cylinder which includes a cylinder body (17) having at the front a base portion (24) and being open at the rear, a piston (21, 42) sliding axially in an internal bore (22) of the cylinder body (17), and at least one dynamic sealing member (59A, 59C) carried by the cylinder body (17, 17B) for cooperation with an outer periphery (42) of the piston (21), wherein the cylinder body (17) is of synthetic material, and wherein the piston (21) has a front face (31) bounding a hydraulic chamber (20), wherein the cylinder body (17) includes, arranged consecutively in the axial direction from front to rear, a blind front piece (17A) which includes said base portion (24), a central piece (17B), and a rear piece (17C) which is open towards the rear, said front, central and rear pieces being joined together in a sealed manner, wherein the internal bore (22) consists of a front portion (22A) and a rear portion (22C), which are formed in the front piece (17A) and rear piece (17C) respectively of the cylinder body (17), said piston extending within said internal bore (22) from said front portion (22A) to said rear portion (22C), and wherein said dynamic sealing member (59A, 59C) is mounted in the central piece (17B) of the cylinder body (17).

2. Control apparatus according to claim 1, wherein said sealed joint is obtained by adhesive bonding.

3. Control apparatus according to claim 1, wherein said joint is obtained by welding with indirect application of heat.

4. Control apparatus according to claim 1, wherein the sealed joint is obtained by mirror welding.

5. Control apparatus according to claim 3, wherein said sealed joint (58A, 58C) is a welded joint made by infrared radiation.

6. Control apparatus according to claim 3, wherein said sealed joint (58A, 58C) is a joint made by ultrasonic welding.

7. Control apparatus according to claim 3, wherein said sealed joint (58A, 58C) is a joint made by friction welding.

8. Control apparatus according to claim 3, wherein said sealed joint (58A, 58C) is a joint made by high frequency welding.

9. Control apparatus according to claim 3, wherein said sealed joint (58A, 58C) is a welded joint made by induction welding of ferromagnetic members.

10. Control apparatus according to claim 1, wherein the piston (21, 42) extends through the central piece (17B) of the cylinder body (17) with a radial clearance.

11. Control apparatus according to claim 1, wherein an axially oriented tubular rear portion (56A) and an axially oriented tubular front portion (56C) of the front piece (17A) and rear piece (17C) of the cylinder body (17), respectively, are welded to a complementary front portion (27A) and rear portion, respectively, of the central piece (17B) of the cylinder body (17).

12. Control apparatus according to claim 3, wherein the outer peripheral surface of said tubular portion (56A, 56C) is fixed sealingly, by welding with indirect application of heat, to an internal peripheral surface (23A, 23C) of said complementary portion (27A, 27C) of the central piece (17B) of the cylinder body (17).

13. Control apparatus according to claim 3, wherein the inner peripheral surface of said tubular portion (56A, 56C) is fixed sealingly, by welding with indirect application of heat, to an external peripheral surface of said complementary portion (27A, 27C) of the central piece (17B) of the cylinder body (17).

14. Control apparatus according to claim 13, wherein said tubular portion (56A, 56C) is in axial abutment against a radial shoulder (64A, 64C) of the central piece (17B) of the cylinder body (17).

15. Control apparatus according to claim 1, wherein the central piece (17B) includes a transverse duct (51) which is open in a substantially radial direction into an axially oriented central hole (53) of the central piece (17B, 54) in facing relationship with the outer periphery (42) of the piston (21).

16. Control apparatus according to claim 1, wherein the central piece (17B) of the cylinder body (17) is configured as a transverse plate for fastening the control apparatus (10).

17. Control apparatus according to claim 1, further comprising a front dynamic sealing member and a rear dynamic sealing member (59A, 59C), which are mounted within the central piece (17B) of the cylinder body.

18. Control apparatus according to claim 17, wherein the front dynamic sealing member (59A) and the rear dynamic sealing member (59C) are each, respectively, disposed in a housing (123A, 123B) formed in the central piece (17B) of the cylinder body, which is open radially inwards.

19. Control apparatus according to claim 1, wherein the rear end of the rear piece (17C) of the cylinder body includes at least one abutment adapted to cooperate with a rear end of the piston so as to limit rearward axial displacement of the piston (21, 42).

20. Control apparatus according to claim 1, wherein the piston (21) includes a peripheral piston jacket (42) which is fixed axially to the piston and which slides axially in the internal bore (22, 22A, 22C) of the cylinder body (17).

21. Control apparatus according to claim 20, wherein the piston jacket (42) has at least one hole (62) for providing communication between the inside and the outside of the piston jacket (42), and wherein the hole (62) is adapted to be displaced to either side of a dynamic sealing member (59A).

\* \* \* \* \*